United States Patent
Gong

(10) Patent No.: US 10,218,618 B2
(45) Date of Patent: *Feb. 26, 2019

(54) METHOD AND APPARATUS FOR PROCESSING OPERATION REQUEST IN STORAGE SYSTEM

(71) Applicant: HUAWEI TECHNOLOGIES CO., LTD., Shenzhen, Guangdong (CN)

(72) Inventor: Hao Gong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/871,317

(22) Filed: Jan. 15, 2018

(65) Prior Publication Data

US 2018/0139134 A1 May 17, 2018

Related U.S. Application Data

(63) Continuation of application No. 14/583,456, filed on Dec. 26, 2014, now Pat. No. 10,009,269, which is a continuation of application No. PCT/CN2013/082755, filed on Aug. 31, 2013.

(51) Int. Cl.
*H04L 12/46* (2006.01)
*H04L 12/741* (2013.01)
*H04L 29/08* (2006.01)

(52) U.S. Cl.
CPC ........ *H04L 45/745* (2013.01); *H04L 67/1097* (2013.01); *H04L 12/4641* (2013.01)

(58) Field of Classification Search
CPC .............. H04L 45/742; H04L 67/1097; H04L 12/4641

See application file for complete search history.

(56) References Cited

U.S. PATENT DOCUMENTS

| 5,987,006 A | 11/1999 | Houjou |
| 7,778,981 B2 | 8/2010 | Armitano et al. |
| 8,392,586 B2 | 3/2013 | Collins et al. |
| 2004/0230795 A1 | 11/2004 | Armitano et al. |
| 2008/0147934 A1 | 6/2008 | Nonaka et al. |
| 2011/0013625 A1 | 1/2011 | Nakamura et al. |
| 2011/0283016 A1 | 11/2011 | Uchida |
| 2012/0020361 A1 | 1/2012 | Ueno |

(Continued)

FOREIGN PATENT DOCUMENTS

| CN | 101471882 A | 7/2009 |
| CN | 102622185 A | 8/2012 |

(Continued)

*Primary Examiner* — Kent K Krueger
(74) *Attorney, Agent, or Firm* — Daniel J. Burns

(57) ABSTRACT

According to embodiments of the present invention, in a storage system, a switch receives an operation request, where the operation request carries request identification; the switch queries, according to the request identification, a flow table of the switch to obtain a flow table entry matching the operation request; and the switch forwards the operation request to a target storage device among storage devices according to a forwarding rule of the matching flow table entry. By using a characteristic of a SDN, the operation request is processed according to the forwarding rule of the flow table entry of the switch, thereby implementing load balancing of the storage devices and reducing information interaction between the storage devices.

12 Claims, 6 Drawing Sheets

(56) References Cited

U.S. PATENT DOCUMENTS

| | | |
|---|---|---|
| 2013/0242879 A1 | 9/2013 | Yamato |
| 2014/0025770 A1 | 1/2014 | Warfield et al. |
| 2014/0071983 A1 | 3/2014 | Banavalikar et al. |
| 2014/0112344 A1 | 4/2014 | Mineshita |
| 2015/0319099 A1 | 11/2015 | Yamato et al. |

FOREIGN PATENT DOCUMENTS

| | | |
|---|---|---|
| CN | 102647362 A | 8/2012 |
| EP | 2819356 A1 | 12/2014 |
| JP | 2008071039 A | 3/2008 |
| JP | 2010146215 A | 7/2010 |
| WO | 2011/074630 A1 | 6/2011 |
| WO | 2011/083682 A1 | 7/2011 |
| WO | 2012/073406 A1 | 6/2012 |
| WO | 2012/173172 A1 | 12/2012 |
| WO | 2013/042598 A1 | 3/2013 |
| WO | 2013/125342 A1 | 8/2013 |
| WO | 2014/084198 A1 | 6/2014 |

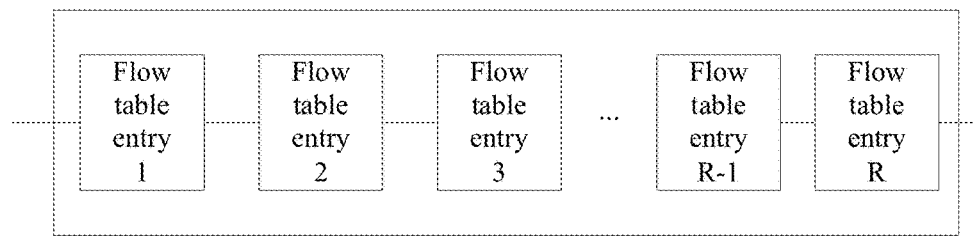
FIG. 4
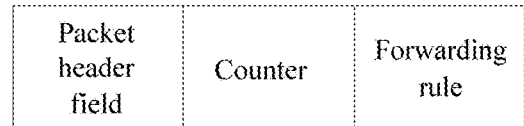
FIG. 5
| Input port | Source MAC address | Destination MAC address | Ethernet type | VLAN ID | Source IP address | Destination IP address | IP port | IP ToS | Source TCP port | Destination TCP port |
FIG. 6

US 10,218,618 B2

METHOD AND APPARATUS FOR PROCESSING OPERATION REQUEST IN STORAGE SYSTEM

CROSS-REFERENCE TO RELATED APPLICATIONS

This application is a continuation of U.S. application Ser. No. 14/583,456, filed on Dec. 26, 2014, now allowed, which is a continuation of International Application No. PCT/CN2013/082755, filed on Aug. 31, 2013. Both of the aforementioned applications are hereby incorporated by reference in their entireties.

TECHNICAL FIELD

The present invention relates to the field of information technologies, and in particular, to a method and an apparatus for processing an operation request in a storage system.

BACKGROUND

In a storage system, a metadata server is used to manage an operation request for the storage system, and record metadata of the storage system. When accessing the storage system, a user firstly needs to communicate with the metadata server to obtain metadata required by the operation request.

To ensure load balancing of a storage system, the storage system is based on a global distributed load balancing scheme in the prior art, and load balancing of the storage system is realized by performing information interaction between storage devices. However, it is inconvenient to perform information interaction between the storage devices.

SUMMARY

To solve the foregoing problem in the prior art, embodiments of the present invention provide a method and an apparatus for processing an operation request in a storage system, and a nonvolatile computer readable storage medium, as well as a method and an apparatus for generating a flow table entry forwarding rule, and a nonvolatile computer readable storage medium.

According to a first aspect, an embodiment of the present invention provides a method for processing an operation request in a storage system, where the storage system includes a controller, a switch, and storage devices communicating with the switch, the controller communicates with the switch, and the controller is configured to formulate and deliver a flow table of the switch; and the method includes:

receiving, by the switch, an operation request, where the operation request carries request identification, and the request identification includes at least one of user group information and storage strategy information;

querying, by the switch according to the request identification, the flow table of the switch to obtain a flow table entry matching the operation request; and forwarding, by the switch, the operation request to a target storage device among the storage devices according to a forwarding rule of the matching flow table entry.

According to the embodiment of the first aspect, in a first possible implementation manner, when the request identification is the user group information, a virtual local area network identification bit of the operation request carries the user group information, and a virtual local area network identification bit in a packet header field of the matching flow table entry carries the user group information; or when the request identification is the storage strategy information, an Internet Protocol Type of Service bit of the operation request carries the storage strategy information, and an Internet Protocol Type of Service bit in a packet header field of the matching flow table entry carries the storage strategy information; or when the request identification is the user group information and the storage strategy information, a virtual local area network identification bit of the operation request carries the user group information, an Internet Protocol Type of Service bit of the operation request carries the storage strategy information, a virtual local area network identification bit in a packet header field of the matching flow table entry carries the user group information, and an Internet Protocol Type of Service bit in a packet header field of the matching flow table entry carries the storage strategy information.

According to the embodiment of the first aspect, in a second possible implementation manner, when the operation request is a read request, the forwarding rule of the matching flow table entry is formulated by the controller according to flow load of storage devices that store requested data.

According to the second possible implementation manner, in a third possible implementation manner, the method further includes:

updating, by the switch, the number of times that the read request is forwarded to the target storage device, where the number of times is recorded in the matching flow table entry.

According to the embodiment of the first aspect or the first possible implementation manner of the embodiment of the first aspect, in a fourth possible implementation manner, when the operation request is a write request, the forwarding rule of the matching flow table entry is formulated by the controller according to remaining storage capacity of the storage devices.

According to the fourth possible implementation manner, in a fifth possible implementation manner, the method further includes:

updating, by the switch, the number of times that the write request is forwarded to the target storage device, where the number of times is recorded in the matching flow table entry.

According to a second aspect, an embodiment of the present invention provides a method for generating a flow table entry forwarding rule, where the method is applied to a storage system, the storage system includes a controller, a switch, and a storage device communicating with the switch, the controller communicates with the switch, and the controller is configured to formulate and deliver a flow table of the switch; and the method includes:

obtaining, by the controller, remaining storage capacity information of the storage device communicating with the switch; and generating, by the controller according to the remaining storage capacity information of the storage device, a forwarding rule matching a write request, where the write request is used to write data into the storage device communicating with the switch.

According to the second aspect, in a first possible implementation manner, the obtaining, by the controller, remaining storage capacity information of the storage device communicating with the switch specifically includes:

receiving, by the controller, the remaining storage capacity information reported by the storage device.

According to the second aspect, in a second possible implementation manner, the obtaining, by the controller, remaining storage capacity information of the storage device communicating with the switch specifically includes:

obtaining, by the controller, the number of times that the write request is forwarded to the storage device and a size of written data, where the number of times and the size are recorded in a flow table entry of the flow table of the switch; and calculating, by the controller, remaining storage capacity of the storage device according to storage capacity of the storage device, the number of times of the write request, and the size of the written data.

According to a third aspect, an embodiment of the present invention provides a method for generating a flow table entry forwarding rule, where the method is applied to a storage system, the storage system includes a controller, a switch, and storage devices communicating with the switch, the controller communicates with the switch, and the controller is configured to formulate and deliver a flow table of the switch; and the method includes:

obtaining, by the controller, flow load information of storage device that store requested data; and generating, by the controller according to the flow load information of the storage devices that store the requested data, a forwarding rule matching a read request.

According to the third aspect, in a first possible implementation manner, the obtaining, by the controller, flow load information of storage devices that store requested data specifically includes:

receiving, by the controller, the flow load information reported by the storage devices that store the requested data.

According to the third aspect, in a second possible implementation manner, the obtaining, by the controller, flow load information of storage devices that store requested data specifically includes:

obtaining, by the controller, the number of times that an operation request is forwarded to the storage devices that store requested data, where the number of times is recorded in a flow table entry of the flow table of the switch, and the operation request includes a write request and a read request.

According to a fourth aspect, an embodiment of the present invention provides a switch, where the switch is applied to a storage system, the storage system includes a controller, the switch, and storage devices communicating with the switch, the controller communicates with the switch, and the controller is configured to formulate and deliver a flow table of the switch; and the switch includes:

a receiving unit, configured to receive an operation request, where the operation request carries request identification, and the request identification includes at least one of user group information and storage strategy information;

a querying unit, configured to query, according to the request identification, the flow table of the switch to obtain a flow table entry matching the operation request; and a forwarding unit, configured to forward the operation request to a target storage device among the storage devices according to a forwarding rule of the matching flow table entry.

According to the fourth aspect, in a first possible implementation manner, when the operation request is a read request, the forwarding rule of the matching flow table entry is formulated by the controller according to flow load of storage devices that store requested data.

According to the fourth aspect, in a second possible implementation manner, when the operation request is a write request, the forwarding rule of the matching flow table entry is formulated by the controller according to remaining storage capacity of the storage devices.

According to a fifth aspect, an embodiment of the present invention provides a controller, where the controller is applied to a storage system, the storage system includes the controller, a switch, and a storage device communicating with the switch, the controller communicates with the switch, and the controller is configured to formulate and deliver a flow table of the switch; and the controller includes:

an obtaining unit, configured to obtain remaining storage capacity information of the storage device communicating with the switch; and a generating unit, configured to generate, according to the remaining storage capacity information of the storage device, a forwarding rule matching a write request, where the write request is used to write data into the storage device communicating with the switch.

According to the fifth aspect, in a first possible implementation manner, the obtaining unit is specifically configured to receive the remaining storage capacity information reported by the storage device.

According to the fifth aspect, in a second possible implementation manner, the obtaining unit is specifically configured to: obtain the number of times that the write request is forwarded to the storage device and a size of written data, where the number of times and the size are recorded in a flow table entry of the flow table of the switch; and the controller calculates remaining storage capacity of the storage device according to storage capacity of the storage device, the number of times of the write request, and the size of the written data.

According to a sixth aspect, an embodiment of the present invention provides a controller, where the controller is applied to a storage system, the storage system includes the controller, a switch, and storage devices communicating with the switch, the controller communicates with the switch, and the controller is configured to formulate and deliver a flow table of the switch; and the controller includes:

an obtaining unit, configured to obtain flow load information of storage devices that store requested data; and a generating unit, configured to generate, according to the flow load information of the storage devices that store the requested data, a forwarding rule matching a read request.

According to the sixth aspect, in a first possible implementation manner, the obtaining unit is specifically configured to receive the flow load information reported by the storage devices that store the requested data.

According to the sixth aspect, in a second possible implementation manner, the obtaining unit is specifically configured to obtain the number of times that an operation request is forwarded to the storage devices that store requested data, where the number of times is recorded in a flow table entry of the flow table of the switch, and the operation request includes a write request and a read request.

According to a seventh aspect, an embodiment of the present invention provides a switch, where the switch is applied to a storage system, the storage system includes a controller, the switch, and storage devices communicating with the switch, the controller communicates with switch, and the controller is configured to formulate and deliver a flow table of the switch; and the switch includes a central processing unit and a memory, where the central processing unit and the memory are connected by using a bus, the memory is configured to store a computer instruction, and the central processing unit executes the computer instruction stored in the memory, so as to implement the first aspect or any one of the first to fourth possible implementation manners of the first aspect in the present invention.

According to an eighth aspect, an embodiment of the present invention provides a controller, where the controller is applied to a storage system, the storage system includes the controller, a switch, and a storage device communicating with the switch, the controller communicates with switch, and the controller is configured to formulate and deliver a flow table of the switch; and the controller includes a central processing unit and a memory, where the central processing unit and the memory are connected by using a bus, the memory is configured to store a computer instruction, and the central processing unit executes the computer instruction stored in the memory, so as to implement the second aspect, or the first or the second possible implementation manner of the second aspect in the present invention.

According to a ninth aspect, an embodiment of the present invention provides a controller, where the controller is applied to a storage system, the storage system includes the controller, a switch, and storage devices communicating with the switch, the controller communicates with switch, and the controller is configured to formulate and deliver a flow table of the switch; and the controller includes a central processing unit and a memory, where the central processing unit and the memory are connected by using a bus, the memory is configured to store a computer instruction, and the central processing unit executes the computer instruction stored in the memory, so as to implement the third aspect, or the first or the second possible implementation manner of the third aspect in the present invention.

According to a tenth aspect, an embodiment of the present invention provides a nonvolatile computer readable storage medium, where the computer storage medium stores a computer instruction, and is configured to implement, when a computer executes the computer instruction, the first aspect or any one of the first to fourth possible implementation manners of the first aspect in the present invention.

According to an eleventh aspect, an embodiment of the present invention provides a nonvolatile computer readable storage medium, where the computer storage medium stores a computer instruction, and is configured to implement the second aspect, or the first or the second possible implementation manner of the second aspect in the present invention when a computer executes the computer instruction.

According to a twelfth aspect, an embodiment of the present invention provides a nonvolatile computer readable storage medium, where the computer storage medium stores a computer instruction, and is configured to implement the third aspect, or the first or the second possible implementation manner of the third aspect in the present invention when a computer executes the computer instruction.

According to embodiments of the present invention, in a storage system, a switch receives an operation request, where the operation request carries request identification; the switch queries, according to the request identification, a flow table of the switch to obtain a flow table entry matching the operation request; and the switch forwards the operation request to a target storage device among storage devices according to a forwarding rule of the matching flow table entry. By using a characteristic of a Software Defined Network (SDN), the operation request is processed according to the forwarding rule of the flow table entry of the switch, thereby implementing load balancing of the storage devices and reducing information interaction between the storage devices.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 4 is a flow table of a switch in a SDN;

FIG. 5 is a schematic structural diagram of a flow table entry in a flow table;

FIG. 6 is a schematic structural diagram of a packet header field of a flow table entry;

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Embodiments of the present invention are applied to a storage system, the storage system includes a controller, a switch, and storage devices communicating with the switch, the controller communicates with the switch, and the controller is configured to formulate and deliver a flow table of the switch. The storage system may be a file level storage system, a data block level storage system, or an object storage system. The storage system may also include at least two of a file level storage system, a data block level storage system, and an object storage system.

Figure 1:
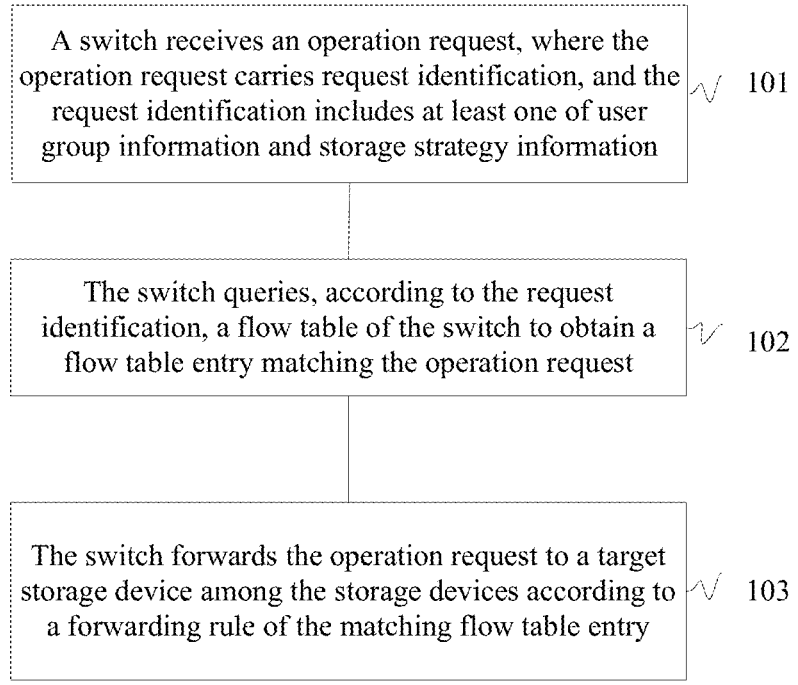
FIG. 1 is a schematic diagram of a method according to an embodiment of the present invention.

As shown in FIG. 1, a method for processing an operation request in a storage system provided in an embodiment of the present invention is as follows:

101: A switch receives an operation request, where the operation request carries request identification, and the request identification includes at least one of user group information and storage strategy information.

102: A switch queries, according to the request identification, a flow table of the switch to obtain a flow table entry matching the operation request.

103: The switch forwards the operation request to a target storage device among the storage devices according to a forwarding rule of the matching flow table entry.

In an implementation manner, when the request identification is the user group information, a virtual local area network identification bit of the operation request carries the user group information, and a virtual local area network identification bit in a packet header field of the matching flow table entry carries the user group information; or when the request identification is the storage strategy information, an Internet Protocol Type of Service bit of the operation request carries the storage strategy information, and an Internet Protocol Type of Service bit in a packet header field of the matching flow table entry carries the storage strategy information; or when the request identification is the user group information and the storage strategy information, a virtual local area network identification bit of the operation request carries the user group information, an Internet Protocol Type of Service bit of the operation request carries the storage strategy information, a virtual local area network identification bit in a packet header field of the matching flow table entry carries the user group information, and an Internet Protocol Type of Service bit in a packet header field of the matching flow table entry carries the storage strategy information.

In an implementation manner, when the operation request is a read request, the forwarding rule of the matching flow table entry is formulated by the controller according to flow load of storage devices that store requested data.

The method further includes: updating, by the switch, the number of times that the read request is forwarded to the target storage device, where the number of times is recorded in the matching flow table entry.

In an implementation manner, when the operation request is a write request, the forwarding rule of the matching flow table entry is formulated by the controller according to remaining storage capacity of the storage devices.

The method further includes: updating, by the switch, the number of times that the write request is forwarded to the target storage device, where the number of times is recorded in the matching flow table entry.

According to the embodiment of the present invention, the request identification includes at least one of the user group information and the storage strategy information, where the user group information may be IP address information of a client, address information of a client, or the like; and the storage strategy information may be the number of copies of requested data in the storage devices, or the number of copies of requested data to be written into the storage devices.

According to the method for processing an operation request in a storage system provided in the embodiment of the present invention, by using a characteristic of a SDN, the operation request is processed according to a forwarding rule of a flow table of a switch, thereby implementing load balancing of storage devices and reducing information interaction between the storage devices.

Figure 2:
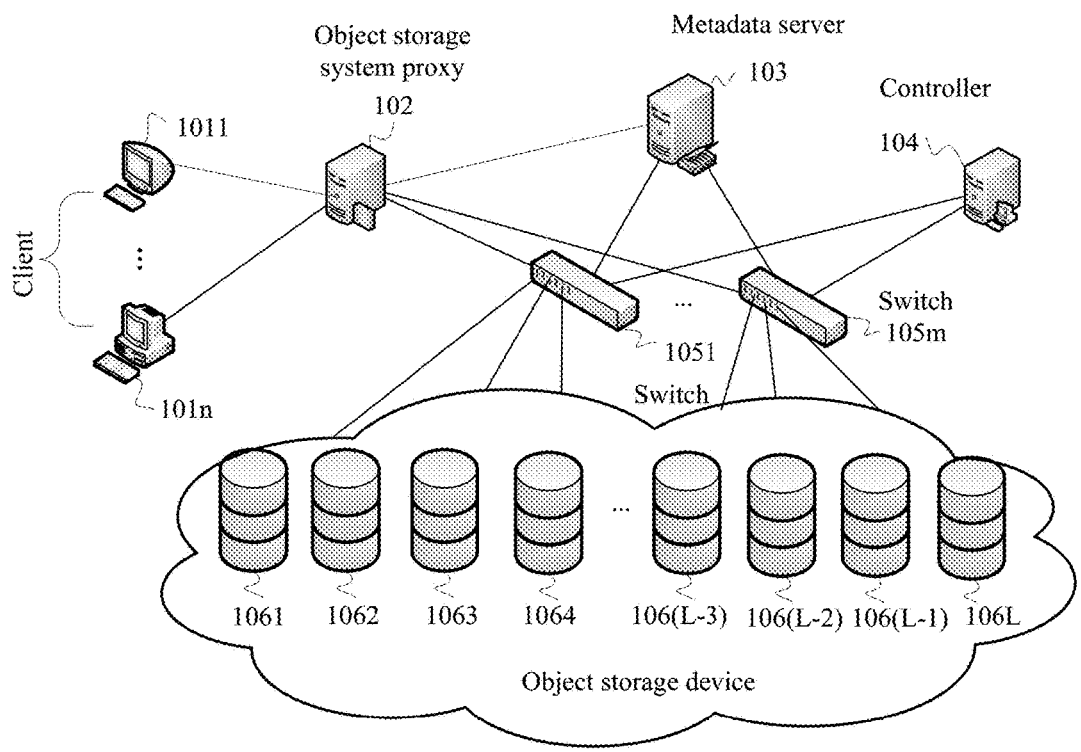
FIG. 2 is a schematic diagram of an object storage system according to an embodiment of the present invention.

Using an object storage system as an example, in the object storage system, an object is used as a basic unit for data storage. One object includes file data and file metadata; an operation request is an object operation request, including an object read request and an object write request; data requested by a read request, namely, requested by an object read request, is an object, and data written by an object write request is an object; and a storage device in the object storage system is an object storage device. In the embodiment of the present invention, as shown in FIG. 2, an object storage system includes a metadata server 103, a controller 104, switches 1051 to 105m, and storage devices 1061, 1062, and 1063 to 106L, that is, object storage devices 1061, 1062, and 1063 to 106L in the object storage system, where L is an integer, indicating the number of object storage devices, and a specific value is not limited. The metadata server 103 is configured to store request identification of data stored in the object storage devices 1061, 1062, and 1063 to 106L, that is, configured to store request identification of an object stored in the object storage devices 1061, 1062, and 1063 to 106L. For the request identification, details are to be described below. The object storage devices 1061, 1062, and 1063 to 106L are configured to store data, that is, configured to store an object in the object storage system. The switches 1051 to 105m and the controller 104 form a SDN. The switches 1051 to 105m communicate with the object storage devices 1061, 1062, and 1063 to 106L. The switches 1051 to 105m are configured to forward an operation request, that is an object operation request in the object storage system, to the object storage devices 1061, 1062, and 1063 to 106L according to a forwarding rule of a flow table entry in a flow table. The controller 104 is configured to formulate and update a flow table entry in a flow table of the switches 1051 to 105m. Only the controller 104 is described in the embodiment of the present invention. In the object storage system of the embodiment of the present invention, the number of controllers is not limited to one, and there may be multiple controllers, so as to implement load balancing and redundancy. For clients 1011 to 101n shown in FIG. 2, in an implementation manner, an object operation request is sent by using an object storage system proxy 102 to access the object storage devices 1061, 1062, and 1063 to 106L, where n is an integer, indicating the number of clients, and a specific value is not limited. In the embodiment of the present invention, the object storage system proxy 102 may be an independent physical server, or may be integrated in the clients 1011 to 101n, which is not limited in the present invention.

Figure 3:
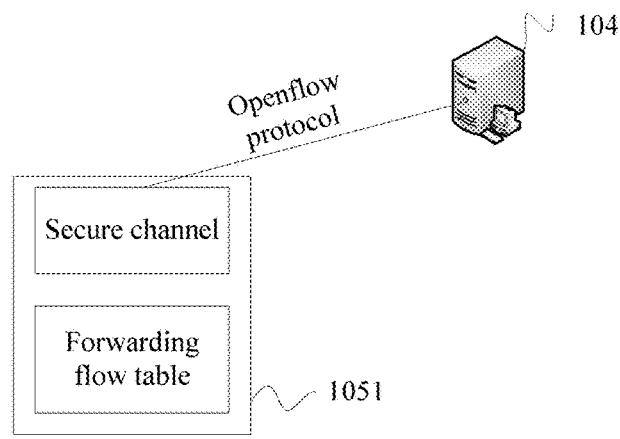
FIG. 3 is a diagram of a system of a SDN based on the Openflow (Openflow) protocol.

In the SDN formed by the controller 104 and the switches 1051 to 105m, the controller 104 communicates with the switches 1051 to 105m by using a secure channel. For example, the controller 104 may communicate with the switches 1051 to 105m by using the Openflow protocol, and the controller 104 formulates and updates a flow table entry of a flow table stored in the switches 1051 to 105m. In the embodiment of the present invention, that the Openflow protocol is used between the controller 104 and the switch 1051 is only an exemplary description. The present invention is also applicable to a manner that another protocol is used for implementation in the SDN. Using the switch 1051 and the controller 104 as an example, as shown in FIG. 3, the controller 104 formulates and updates a flow table entry of a flow table in the switch 1051; and when the switch 1051 receives an object operation request, parses the object operation request, queries a flow table entry matching the object operation request in the flow table of the switch 1051, and processes the object operation request according to a forwarding rule of the matching flow table entry. Specifically, in an implementation manner, the flow table in the switch 1051 is formed by a flow table entry 1 and flow table entries 2 to R, where R is a natural number. As shown in FIG. 4, the switch 1051 receives an object operation request, and queries a flow table entry of the flow table, where the flow table entry of the flow table is generally queried in a stream line manner; and if a flow table entry matching the object operation request is obtained by querying, performs processing according to a forwarding rule of the matching flow table entry. For a flow table entry of a flow table shown in FIG. 4, a specific structure is shown in FIG. 5, and includes three parts: a packet header field, a counter, and a forwarding rule. The packet header field is used to match an object operation request; the counter is used to count the number of times that the object operation request matching the flow table entry is processed; and the forwarding rule is used to determine a forwarding manner of the object operation request, for example, deciding how to forward the object operation request, deciding to which port the operation request is forwarded, and the like. As shown in FIG. 6, the packet header field includes an input port, a source media access control (Media Access Control, MAC) address, a destination MAC address, an Ethernet type, virtual local area network identification (Virtual Local Area Network Identification, VLAN ID), a source Internet Protocol (IP) address, a destination IP address, an IP port, an IP Type of Service (ToS) bit, a source Transmission Control Protocol (TCP) port, and a destination TCP port. In the embodiment of the present invention, an object operation request may encapsulate request identification, and the request identification includes at least one of user group information and storage strategy information. For example, the user group information is encapsulated in the object operation request. Specifically, the user group information may be encapsulated in a VLAN ID bit of the object operation request, and the storage strategy information may be encapsulated in an IP ToS bit of the object operation request. Encapsulation of the request identification may be implemented by the object storage system proxy 102. After receiving an object operation request, the switch 1051 queries a flow table entry matching the object operation request in the flow table of the switch 1051. The object operation request is processed according to a forwarding rule of the matching flow table entry obtained by querying. After the object operation request is forwarded according to the forwarding rule, the counter updates the number of times for forwarding the object operation request according to the flow table entry. When the flow table entry matching the object operation request does not exist, the object operation request is forwarded to the controller 104; and the controller 104 formulates a forwarding rule for the object operation request, generates a flow table entry, and updates the flow table in the switch 1051.

Figure 7:
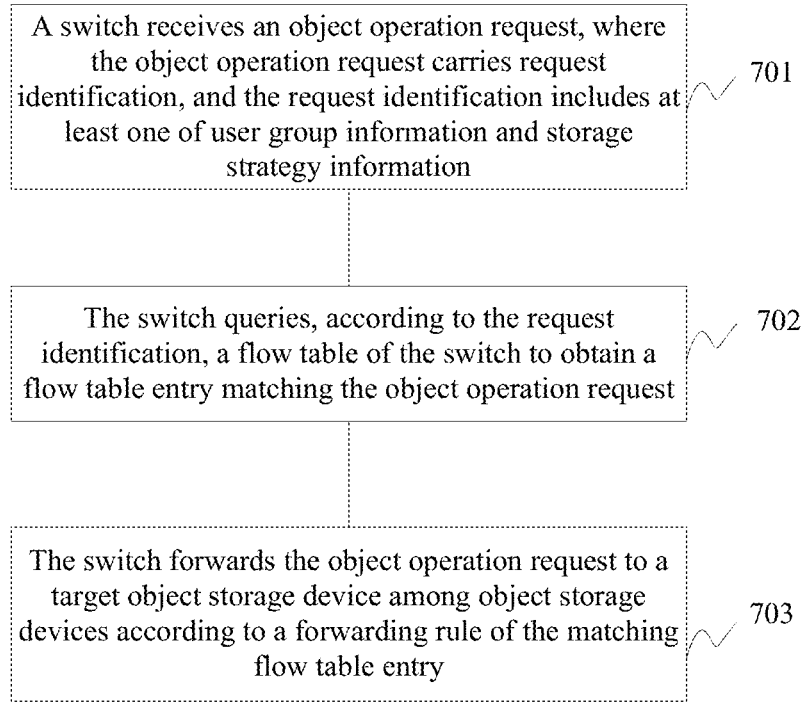
FIG. 7 is a schematic diagram of a method for processing an object operation request in an object storage system according to an embodiment of the present invention.

Based on the foregoing description, as shown in FIG. 7, an embodiment of the present invention provides a method for processing an object operation request in an object storage system under a system architecture shown in FIG. 2, including:

Step 701: A switch receives an object operation request, where the object operation request carries request identification, and the request identification includes at least one of user group information and storage strategy information.

702: The switch queries, according to the request identification, a flow table of the switch to obtain a flow table entry matching the object operation request.

703: The switch forwards the object operation request to a target object storage device among object storage devices according to a forwarding rule of the matching flow table entry.

In the foregoing method for processing an object operation request in an object storage system, when the request identification is the user group information, a virtual local area network identification bit of the object operation request carries the user group information, and a virtual local area network identification bit in a packet header field of the matching flow table entry carries the user group information; or when the request identification is the storage strategy information, an Internet Protocol Type of Service bit of the object operation request carries the storage strategy information, and an Internet Protocol Type of Service bit in a packet header field of the matching flow table entry carries the storage strategy information; or when the request identification is the user group information and the storage strategy information, a virtual local area network identification bit of the object operation request carries the user group information, an Internet Protocol Type of Service bit of the object operation request carries the storage strategy information, a virtual local area network identification bit in a packet header field of the matching flow table entry carries the user group information, and an Internet Protocol Type of Service bit in a packet header field of the matching flow table entry carries the storage strategy information.

In the object storage system provided in the embodiment of the present invention, an object operation request carrying request identification is forwarded to a corresponding object storage device by using a switch in a SDN, a controller formulates a forwarding rule in a flow table entry of the switch, and the switch forwards an object operation request according to the forwarding rule in the flow table entry, thereby implementing load balancing of the object storage devices and reducing information interaction between the object storage devices.

With reference to FIG. 2, specifically, in the method for processing an object operation request shown in FIG. 7, when the object operation request is an object read request, the forwarding rule of the matching flow table entry is formulated by the controller according to flow load of object storage devices that store a requested object. After the switch forwards the object operation request to a target object storage device among the object storage devices according to a forwarding rule of the matching flow table entry, the method further includes: updating, by the switch, the number of times that the object read request is forwarded to the target object storage device, where the number of times is recorded in the matching flow table entry. The following describes details.

Using an example that the client 101 sends a read request to the object storage system, the client 101 sends a read request, and the object storage system proxy 102 receives the read request sent by the client 101, accesses the metadata server 103 according to the read request, and obtains request identification of a requested object, where the request identification includes at least one of user group information and storage strategy information, the request identification is used to store, in the metadata server 103, after the object is written into the object storage devices, at least one of the user group information and the storage strategy information carried in an object write request; and the request identification stored in the metadata server 103 is determined by content of the request identification of the object that is registered with the metadata server 103 by the object storage devices that store the object written. When the client initiates a read request for the object to the object storage system, the metadata server 103 is queried to obtain the request identification of the object, where the user group information may be IP address information of the client that writes the object into the object storage system, or other information that may identify the client that writes the object into the object storage system; and the storage strategy information may be the number of copies of the requested object in the object storage devices. For the object read request, because the requested object has already been stored in the object storage devices, when the requested object is written into the object storage devices, the request identification of the object is sent to the metadata server 103. In the embodiment of the present invention, request identification including user group information and a storage strategy is used as an example, where the user group information is IP address information of a client that writes the object into the object storage system, and the storage strategy information is the number of copies of the requested object, which is 3. The object storage system proxy 102 encapsulates the request identification obtained from the metadata server 103 to generate the object read request, and a specific format of the object read request is shown in FIG. 6. In the embodiment of the present invention, the user group information is encapsulated in a VLAN ID bit of the object read operation request, and the storage strategy information is encapsulated in an IP ToS bit of the object read operation request.

The object storage system proxy 102 sends the object read request to the switch 1051.

The switch 1051 receives the object read request sent by the storage system proxy 102, and parses VLAN ID bit and ToS bit information of the object read request to obtain the user group information and the storage strategy information, respectively. A flow table entry of the flow table is queried according to the user group information and storage strategy information that are obtained by parsing. The user group information that is parsed from the VLAN ID bit of the object read request and the storage strategy information that is parsed from the IP ToS bit of the object read request are used to match the packet header field of the flow table entry each to find a matching flow table entry, and then the object read request is forwarded according to the forwarding rule of the matching flow table entry. Specifically, for the object read request, the forwarding rule of the flow table entry is formulated by the controller 104 according to flow load of the object storage devices that store the requested object, that is, a target object storage device is selected according to flow load of the object storage device where the requested object is located. For example, in the flow table shown in FIG. 4, the flow table entry 3 is a flow table entry matching the object read request, and a structure of the flow table entry 3 is shown in FIG. 5, information in the VLAN ID of the packet header field matches information in the VLAN ID of the object read request, and information in the IP ToS bit of the packet header field matches information in the IP ToS bit of the object read request. The forwarding rule of the flow table entry 3 is formulated by the controller 104 according to flow load of the object storage devices that store the requested object, for example, the object storage devices 1061, 1062, and 1063 are object storage devices storing three copies of the requested object. The controller 104 determines, according to flow load of the object storage devices 1061, 1062, and 1063, that the object storage device 1061 is an object storage device with lightest flow load, and the forwarding rule is to forward the object read request to the object storage device 1061. The controller 104 formulates the forwarding rule according to flow load of the object storage devices 1061, 1062, and 1063; specifically, the switch 1051 periodically reports, to the controller 104, the number of times of forwarding the object operation request, where the number of times is recorded in each flow table entry in the flow table, or the controller 104 periodically obtains, from the switch 1051, the number of times of forwarding the object operation request, where the number of times is recorded in each flow table entry of the flow table, or the object storage devices 1061, 1062, and 1063 report flow load to the controller 104, so as to update the forwarding rule of the flow table entry, where the object operation request herein includes an object read request and an object write request. In a manner, the controller 104 formulates or updates the forwarding rule of the flow table entry according to the number of times that the object operation request is forwarded to object storage devices 1061, 1062, and 1063, where the number of times is recorded in the counter of the flow table entry. For example, there are 50 flow table entries with a forwarding rule that is to forward an object operation request to the object storage device 1061, and in the foregoing period, for the 50 flow tables, the total number of times of forwarding the object operation request is 5000, where the number of times is recorded by the counter of each flow table entry; there are 45 flow table entries with a forwarding rule that is to forward an object operation request to the object storage device 1062, and in the foregoing period, for the 45 flow tables, the total number of times of forwarding the object operation request is 5500, where the number of times is recorded by the counter of each flow table entry times of forwarding the object operation request; and there are 50 flow table entries with a forwarding rule that is to forward an object operation request to the object storage device 1063, and in the foregoing period, for the 50 flow tables, the total number of times of forwarding the object operation request is 6000, where the number of times is recorded by the counter of each flow table entry times of forwarding the object operation request. In the foregoing period, the object storage device 1061 has lightest flow load. Therefore, in the embodiment of the present invention, for an object requested by the object read request, the forwarding rule that the controller 104 formulates for the object read request according to flow load of the object storage devices 1061, 1062, and 1063 storing the object is to forward the object read request to the object storage device 1061. When no matching flow table entry is obtained by the switch 1051 by querying, the switch 1051, by using the Openflow protocol, forwards the object read request to the controller 104 through a secure channel shown in FIG. 2; the controller 104 determines the requested object according to the request identification carried in the object read request, formulates a flow table entry for the object read request according to flow load of the object storage devices that stores the requested object, and delivers the flow table entry to the switch 1051, so as to update the flow table in the switch 1051; and the switch 1051 forwards the object read request according to the flow table entry delivered by the controller 104.

In the embodiment of the present invention, assuming that the object storage device 1061 is an object storage device with lightest flow load, the switch forwards, according to a matching forwarding rule in the flow table entry 3, the object operation request to a port over which the object storage device 1061 and the switch 1051 communicate. The counter in the flow table entry 3 update the number of times of forwarding the object read request to the object storage device 1061.

The switch 1051 changes a destination IP address of the object read request to an IP address of the object storage device 1062, changes a destination MAC address of the object read request to a MAC address of the object storage device 1062, and forwards a modified object read request to the object storage device 1062.

After receiving the modified object read request, the object storage device 1062 returns content of the requested object to the object storage system proxy 102.

The object storage system proxy 102 returns the content of the requested object to the client 101.

According to the embodiment of the present invention, another implementation manner for an object read request is that for an object having more than two copies, for example, the requested object in the embodiment of the present invention, which has three copies in the object storage devices, the forwarding rule of the flow table entry matching the object read request may be to forward the object read request to two object storage devices. As described in the foregoing embodiment, for example, there are 50 flow table entries with a forwarding rule that is to forward the object operation request to the object storage device 1061, and in the foregoing period, for the 50 flow tables, the total number of times of forwarding the object operation request is 5000, where the objet operation request is recorded by the counter of each flow table entry; there are 45 flow table entries with a forwarding rule that is to forward an object operation request to the object storage device 1062, and in the foregoing period, for the 45 flow tables, the total number of times of forwarding the object operation request that is recorded by the counter of each flow table entry is 5500; and there are 50 flow table entries with a forwarding rule that is to forward an object operation request to the object storage device 1063, and in the foregoing period, for the 50 flow tables, the total number of times of forwarding the object operation request that is recorded by the counter of each flow table entry is 6000. In the foregoing period, the object storage devices 1061 and 1062 are target object storage devices with relatively light flow load; if the object read request is to be forwarded to the two target devices, the flow table entry forwarding rule that the controller 104 formulates for the object read request is to forward the object read request to the object storage devices 1061 and 1062, thereby implementing object read concurrency and improving efficiency of the object read request.

In the embodiment of the present invention, the request identification carried in the object read request may also include only one of user group information or storage strategy information, which is not limited in the present invention.

In the object storage system provided in the embodiment of the present invention, according to the processing method for forwarding an object read request carrying request identification to a corresponding object storage device by using a switch in SDN, a controller delivers a flow table entry corresponding to a forwarding rule of the object read request according to flow load of a target object storage device, and the switch forwards the object read request according to the forwarding rule in the flow table entry, thereby implementing load balancing of the object storage devices and reducing information interaction between the object storage devices.

With reference to FIG. 2, specifically, in the method for processing an object operation request shown in FIG. 7, when the object operation request is an object write request, the forwarding rule of the matching flow table entry is formulated by the controller according to remaining storage capacity of the object storage devices. After the switch forwards the object operation request to a target object storage device among the object storage devices according to a forwarding rule of the matching flow table entry, the method further includes: updating, by the switch, the number of times that the write request is forwarded to the target object storage device, where the number of times is recorded in the matching flow table entry. The following describes details.

Using an example that the client 101 sends a write request to the object storage system, the client 101 sends a write request, and the object storage system proxy 102 receives the write request sent by the client 101. Because an object is to be written into the object storage system, the metadata server 103 does not have request identification of the object to be written, and the object storage system proxy 102 obtains, from the write request, the request identification of the object to be written. The request identification includes at least one of user group information and a storage strategy information, where the user group information may be IP address information of the client that writes the object into the object storage system, or other information that may identify the client that writes the object into the object storage system; and the storage strategy information may be the number of copies of the written object in the object storage devices. In the embodiment of the present invention, request identification including user group information and a storage strategy information is used as an example, where the user group information is IP address information of a client, and the storage strategy information is specifically the number of copies of an object requested by a user in the object storage devices 1061, 1062, and 1063 to 106L, where the number of copies of the object is 3.

The object storage system proxy 102 encapsulates the request identification to generate an object write request. A specific format of the object write request is shown in FIG. 6. The object storage system proxy 102 encapsulates the obtained request identification in a specific identification bit of the object write request. In the embodiment of the present invention, the user group information is encapsulated in a VLAN ID bit of the object write request, and the storage strategy information is encapsulated in an IP ToS bit of the object write request.

The object storage system proxy 102 sends the object write request to the switch 1051.

The switch 1051 receives the object write request sent by the object storage system proxy 102, and parses VLAN ID bit and ToS bit information of the object write request to obtain the user group information and the storage strategy information, respectively. A flow table entry of the flow table is queried according to the user group information and storage strategy information that are obtained by parsing. The user group information that is parsed from the VLAN ID bit of the object write request and the storage strategy information that is parsed from the IP ToS bit of the object write request are used to match the packet header field of the flow table entry, respectively to find a matching flow table entry, and then the object write request is forwarded according to the forwarding rule of the matching flow table entry.

Specifically, for the object write request, the forwarding rule of the flow table entry is formulated by the controller 104 according to remaining storage capacity of the object storage devices 1061, 1062, and 1063 to 106L, that is, a target object storage device is selected for the object write request according to the remaining storage capacity of the object storage devices. For example, in the flow table shown in FIG. 4, the flow table entry 3 is a flow table entry matching the object write request, and a structure of the flow table entry 3 is shown in FIG. 5, information in the VLAN ID of the packet header field matches information in the VLAN ID of the object write request, and information in the IP ToS bit of the packet header field matches information in the IP ToS bit of the object write request. An operation rule of the flow table entry 3 is determined by the controller 104 according to the remaining storage capacity of the object storage devices 1061, 1062, and 1063 to 106L, that is, a target object storage device is determined according to a size of the remaining storage capacity of the object storage devices 1061, 1062, and 1063 to 106L. An implementation manner is that the switch 1051 periodically reports, to the controller 104, the number of times of forwarding the object write request, where the number of times is recorded in each flow table entry in the flow table, or the controller 104 periodically obtains, from the switch 1051, the number of times of forwarding the object write request, where the number of times is recorded in each flow table entry in the flow table, or the object storage devices 1061, 1062, and 1063 to 106L report the remaining storage capacity to the controller 104. Remaining storage capacity of each object storage devices is calculated according to the number of times that the object write request is forwarded to each object storage device and a size of the object to be written, where the number of times is counted by each flow table entry in the flow table of the switch 1051. Specifically, an implementation scheme is that, using the object storage device 1061 as an example, the controller 104 calculates, according to the number of times of forwarding the object write request to the object storage device 1061 and the size of the written object of the object write request each time, a total size of objects written into the object storage device 1061 for storage, where the number of times is recorded in each flow table entry; and obtains, by subtracting occupied object storage capacity from total storage capacity of the object storage device 1061, remaining storage capacity of the object storage device 1061. Similarly, remaining storage capacity of the object storage devices 1062 to 106L in a period can be obtained. In the embodiment of the present invention, when the object write request is a first object write request, and the flow table of the switch 1051 does not have a matching flow table entry, the switch 1051 forwards the object write request to the controller 104 through a secure channel shown in FIG. 3 by using the Openflow protocol. The controller 104 formulates, according to the remaining storage capacity of the current object storage devices 1061, 1062, and 1063 to 106L, a forwarding rule for the object write request, generates the flow table entry 3 in the embodiment of the present invention, and delivers the flow table entry 3 to the switch 1051. The switch 1051 updates the flow table according to the flow table entry 3 and forwards, according to the forwarding rule of the flow table entry 3, the object write request. For example, according to the storage strategy information that the switch 1051 obtains by parsing the object write request, the number of copies of a written object is 3, and the controller 104 selects, from the object storage devices 1061, 1062, and 1063 to 106L, three object storage devices with maximum remaining storage capacity as target object storage devices. For example, the object storage devices 1063, 1067, and 1068 are three object storage devices with maximum remaining storage capacity, of which the remaining storage capacity is all 1000 Gb, and remaining storage capacity of other object storage devices is less than 1000 Gb; or the object storage devices 1063, 1067, and 1068 are three object storage devices with maximum remaining storage capacity, of which the remaining storage capacity is 1000 Gb, 950 Gb, and 900 Gb successively, and remaining storage capacity of other object storage devices is less than 900 Gb. Therefore, the operation rule that the controller 104 formulates for the object write request is to forward the object write request to the object storage devices 1064, 1067, and 1068. The object write request is forwarded to a destination port of the switch 1051 according to the forwarding rule of the flow table entry 3, where the destination port of the switch 1051 is a port over which the switch 1051 communicates with the object storage devices 1064, 1067, and 1068 separately. The controller 104 records, according to the request identification carried in the object write request, information of the object storage devices that store the object; may obtain, by using the recorded information of the object storage devices that store the object, flow load of the object storage devices that store the object; formulates, according to the flow load of the object storage devices that store the object, a forwarding rule for the object read request reading the object; generates a flow table entry matching the object read request reading the object, where the flow table entry carries request identification of the object; and matching the request identification carried in the object read request with the request identification carried in the flow table entry, so as to determine the matching flow table entry. For a specific procedure, reference may be made to the description of the object read request part in the embodiment, and details are not repeatedly described herein.

The switch 1051 changes a destination IP address of the object write request to an IP address of the object storage device 1062, and changes a destination MAC address of the object write request to a MAC address of the object storage device 1062. In the embodiment of the present invention, the object write request is separately forwarded to the object storage devices 1064, 1067, and 1068 according to the forwarding rule of the matching flow table entry. Correspondingly, the destination IP address of the object write request is changed to an IP address of the object storage device 1064, and the destination MAC address of the object write request is changed to a MAC address of the object storage device 1064, and a modified object write request is forwarded to the object storage device 1064. Similarly, the object write request to be forwarded to the object storage devices 1067 and 1068 is modified, and a modified object write request is separately forwarded to the object storage devices 1067 and 1068.

The counter in the flow table entry 3 separately updates the number of times of forwarding the object write request to the object storage devices 1064, 1067, and 1068.

The object storage devices 1064, 1067, and 1068 store a written object, and register request identification of the written object to the metadata server 103, where the metadata server 103 may not store specific storage location information of the object, but only needs to include the request identification of the object.

In the embodiment of the present invention, the request identification carried in the object write request may also include only one of user group information and storage strategy information, which is not limited in the present invention. Preferably, the request identification at least includes the user group information.

In the object storage system provided in the embodiment of the present invention, according to the processing method for forwarding an object write request carrying request identification to a corresponding object storage device by using a switch in a SDN, a controller delivers, according to remaining storage capacity of the object storage devices, a forwarding rule of the object write request to generate a flow table entry of the switch, and the switch forwards the object write request according to the forwarding rule of the matching flow table entry, thereby implementing load balancing of storage capacity of the object storage devices and reducing information interaction between the object storage devices. In addition, for an object written in the object storage system, the metadata server may only record request identification of the object, thereby reducing work load of the metadata server.

In the object storage system provided in the embodiment of the present invention, when an object storage device is added, for example, when an object storage device 1061(L+1) is added, the object storage device 1061(L+1) is registered with the controller 104; and information registered with the controller 104 includes a MAC address of the object storage device 1061(L+1), a number of a port for communicating with the switch 1051, and storage capacity. After receiving registration information of the object storage device 1061(L+1), the controller 104 records the registration information of the object storage device 1061(L+1), formulates a forwarding rule, generates a new flow table entry, and delivers the flow table entry to the switch 1051.

In the object storage system provided in the embodiment of the present invention, when an object storage device in the object storage system exits due to a fault or another reason, for example, when an object storage device 1061L exits, the controller 104 receives a state change message of the object storage device 1061L, where the message carries a MAC address of the object storage device 1061L, a number of a port for communicating with the switch 1051, and storage capacity information; and the controller 104 deletes, according to the state change message, a flow table entry with a forwarding rule that is to forward to the object storage device 1061L. For a flow table entry with a forwarding rule that is to forward the object read request to the object storage device 1061L, the controller 104 generates a flow table entry with a forwarding rule that is to forward to a redundant object storage device of the object storage device 1061L, where the redundant object storage device is an object storage device that stores an object of the object storage device 1061L.

Therefore, using of the SDN in the object storage system implements an increase or decrease of object storage devices of the object storage system, and improves flexibility of the object storage system.

Figure 8:
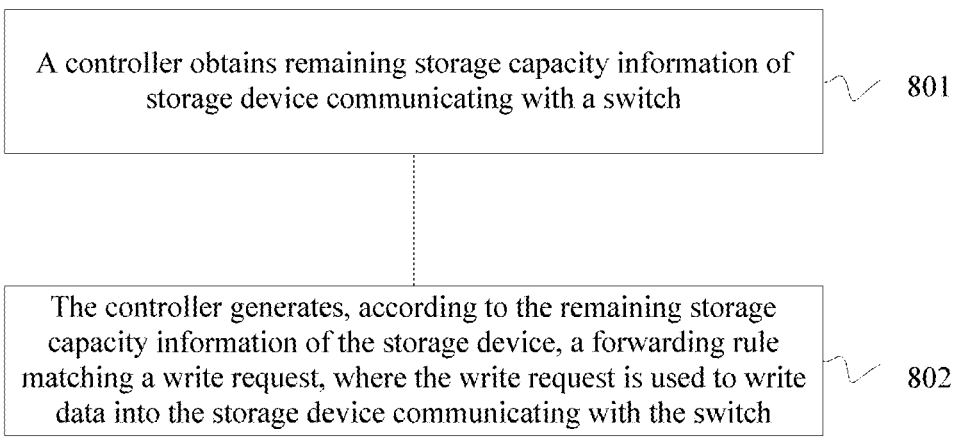
FIG. 8 is a schematic diagram of a method for generating a flow table entry forwarding rule by a controller according to an embodiment of the present invention.

According to the description of the embodiment of the method for processing an operation request in a storage system, the controller 104 provides a method for generating a flow table entry forwarding rule, as shown in FIG. 8, including:

Step 801: The controller obtains remaining storage capacity information of the storage device communicating with the switch.

Step 802: The controller generates, according to the remaining storage capacity information of the storage device, a forwarding rule matching a write request, where the write request is used to write data into the storage device communicating with the switch.

In an implementation manner, that the controller obtains remaining storage capacity information of the storage device communicating with the switch specifically includes: receiving, by the controller, the remaining storage capacity information reported by the storage device.

In an implementation manner, that the controller obtains remaining storage capacity information of the storage device communicating with the switch specifically includes: obtaining, by the controller, the number of times of forwarding the write request to the storage device and a size of written data, where the number of times and the size are recorded in a flow table entry in the flow table of the switch; and calculating, by the controller, remaining storage capacity of the storage device according to storage capacity of the storage device, the number of times of the write request, and the size of the written data.

Specifically, in the object storage system, according to the method in which the controller 104 in the embodiment of the present invention provides a method for generating a flow table entry forwarding rule, a storage device is specifically an object storage device, the write request is specifically an object write request, and data written into the object storage device according to the object write request is an object.

In the storage system provided in the embodiment of the present invention, a controller based on a SDN generates, according to remaining storage capacity information of a storage device, a forwarding rule of a flow table entry matching a write request, so that a switch processes the write request according to the forwarding rule generated by the controller, thereby implementing load balancing of the storage device and reducing information interaction between storage devices. The storage system applicable to the embodiment of the present invention may be a file level storage system, a data block level storage system, or an object storage system, or may also be a storage system including at least two of a file level storage system, a data block level storage system, and an object storage system. Specifically, for applicability to the object storage system, reference may be made to the foregoing embodiment of processing an object operation request in an object operation system, and details are not repeatedly described herein.

Figure 9:
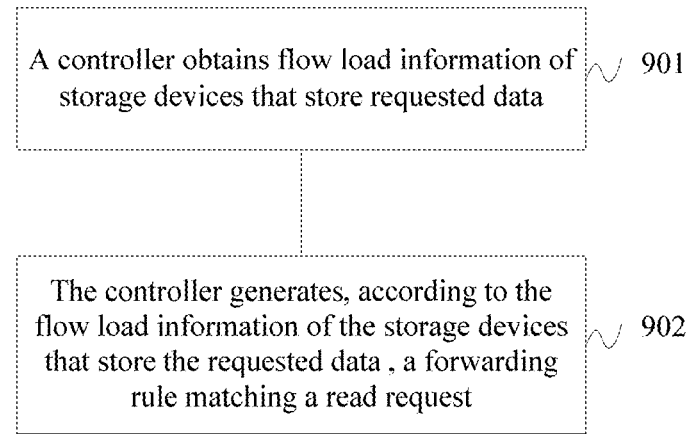
FIG. 9 is a schematic diagram of a method for generating a flow table entry forwarding rule by a controller according to an embodiment of the present invention.

According to the description of the embodiment of the method for processing an operation request in a storage system, the controller 104 provides a method for generating a flow table entry forwarding rule, as shown in FIG. 9, including:

901: The controller obtains flow load information of storage devices that store requested data.

902: The controller generates, according to the flow load information of the storage devices that stores the requested data, a forwarding rule matching a read request.

In an implementation manner, that the controller obtains flow load information of storage devices that store requested data specifically includes: receiving, by the controller, the flow load information reported by the storage devices that store the requested data.

In an implementation manner, that the controller obtains flow load information of storage devices that store requested data specifically includes: obtaining, by the controller, the number of times of forwarding an operation request to the storage devices that store the requested data, where the number of times is recorded in a flow table entry in the flow table of the switch, and the operation request includes a write request and a read request.

Specifically, in the object storage system, according to the method in which the controller 104 provides a method for generating a flow table entry forwarding rule in the embodiment of the present invention, a storage device is specifically an object storage device, the read request is specifically an object read request, and data requested by the object read request and stored in an object storage device is an object.

In the storage system provided in the embodiment of the present invention, a controller based on a SDN generates, according to flow load of storage devices that store requested data, a forwarding rule of a flow table entry matching a read request, so that a switch processes the read request according to the forwarding rule generated by the controller, thereby implementing load balancing of the storage devices and reducing information interaction between the storage devices. The storage system applicable to the embodiment of the present invention may be a file level storage system, a data block level storage system, or an object storage system, or may also be a hybrid storage system including at least two of a file level storage system, a data block level storage system, and an object storage system. Specifically, for applicability to the object storage system, reference may be made to the foregoing embodiment of processing an object operation request in an object operation system, and details are not repeatedly described herein.

According to the foregoing embodiments of the present invention, a SDN is used in the storage system; in the SDN, a specific implementation of the controller may be a universal server running controller software, so as to implement control over a switch on a data forwarding plane. A structure of the universal server includes a central processing unit, a memory, and the like; the central processing unit and the memory are connected by using a bus; and the controller and a switch implement communication described in the foregoing embodiments. The switch located in the data forwarding plane may be a universal switch or an Openflow switch, including a central processing unit, a memory, and the like; the central processing unit and the memory are connected by using a bus; and the central processing unit and the controller implement communication described in the foregoing embodiments, and implement forwarding of an object operation request at the same time. In the embodiment of the present invention, the controller and the switch are only described exemplarily, and other switches and controllers that are capable of implementing the SDN may also be used to implement the present invention.

Figure 10:
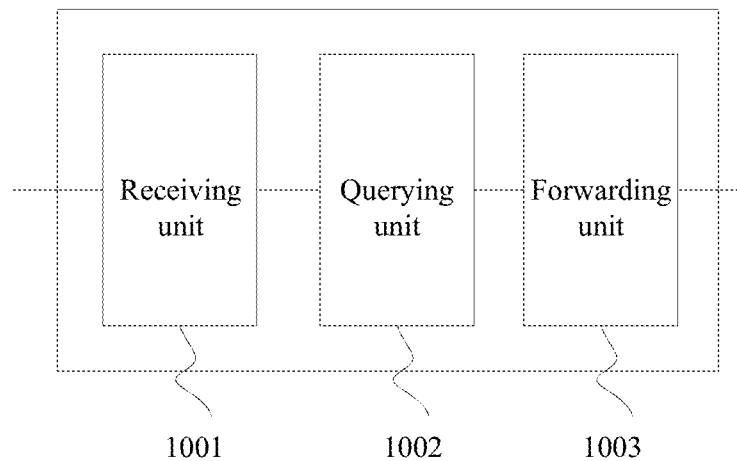
FIG. 10 is a schematic diagram of a switch.

According to the description of the foregoing method embodiments of the present invention, an embodiment of the present invention provides a switch, as shown in FIG. 10, including a receiving unit 1001, a querying unit 1002, and a forwarding unit 1003. The receiving unit 1001 is configured to receive an operation request, where the operation request carries request identification, and the request identification includes at least one of user group information and storage strategy information; the querying unit 1002 is configured to query, according to the request identification, a flow table of the switch to obtain a flow table entry matching the operation request; and the forwarding unit 1003 is configured to forward the operation request to a target storage device among storage devices according to the forwarding rule of the matching flow table entry.

According to the switch shown in FIG. 10, when the operation request is a read request, the forwarding rule of the matching flow table entry is formulated by the controller according to flow load of storage devices that store requested data, and when the operation request is a write request, the forwarding rule of the matching flow table entry is formulated by the controller according to remaining storage capacity of the storage devices.

Specifically, in the object storage system, the receiving unit 1001 is configured to receive an object operation request, where the object operation request carries request identification, and the request identification includes at least one of user group information and storage strategy information; the querying unit 1002 is configured to query, according to the request identification, a flow table of a switch to obtain a flow table entry matching the object operation request; and the forwarding unit 1003 is configured to forward the object operation request to a target object storage device among object storage devices according to a forwarding rule of the matching flow table entry, where when the object operation request is an object read request, the forwarding rule of the matching flow table entry is formulated by the controller according to flow load of object storage devices that store a requested object; and when the object operation request is an object write request, the forwarding rule of the matching flow table entry is formulated by the controller according to remaining storage capacity of the object storage devices.

In the storage system provided in the embodiment of the present invention, according to the processing method for forwarding an operation request carrying request identification to a corresponding storage device by using a switch in a SDN, a controller formulates a forwarding rule in a flow table entry of a switch, and the switch forwards the operation request according to the forwarding rule in the flow table entry, thereby implementing load balancing of storage devices and reducing information interaction between the storage devices.

Figure 11:
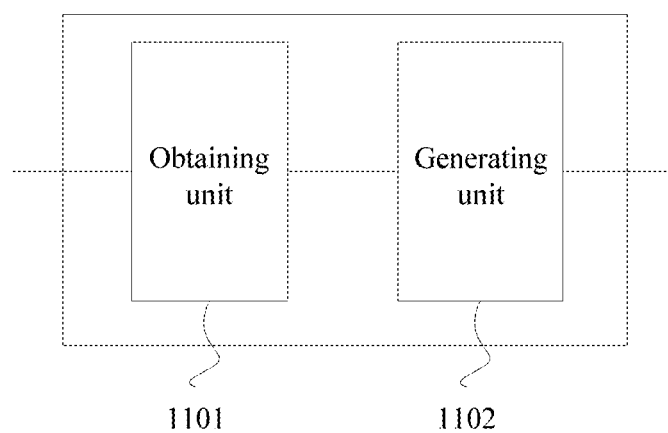
FIG. 11 is a schematic diagram of a controller.

According to the description of the foregoing method embodiments of the present invention, an embodiment of the present invention provides a controller, as shown in FIG. 11, including an obtaining unit 1101 and a generating unit 1102, where the obtaining unit 1101 is configured to obtain remaining storage capacity information of a storage device communicating with a switch; and the generating unit 1102 is configured to generate, according to the remaining storage capacity information of the storage device, a forwarding rule matching a write request, where the write request is used to write data into the storage device communicating with the switch. In an implementation manner, the obtaining unit 1101 is specifically configured to receive the remaining storage capacity information reported by the storage device. In an implementation manner, the obtaining unit 1101 is specifically configured to obtain the number of times of forwarding the write request to the storage device and a size of written data, where the number of times and the size are recorded in a flow table entry of a flow table of the switch, and calculate remaining storage capacity of the storage device according to storage capacity of the storage device, the number of times of the write request, and the size of the written data.

Specifically, in an object storage system, the obtaining unit 1101 is configured to obtain remaining storage capacity information of an object storage device communicating with a switch; and the generating unit 1102 is configured to generate, according to the remaining storage capacity information of the object storage device, a forwarding rule matching an object write request, where the object write request is used to write an object in the object storage device communicating with the switch. In an implementation manner, the obtaining unit 1101 is specifically configured to receive the remaining storage capacity information reported by the object storage device. In an implementation manner, the obtaining unit 1101 is specifically configured to obtain the number of times of forwarding an object write request to the object storage device and a size of written data, where the number of times and the size are recorded in a flow table entry of a flow table of the switch, and calculate remaining storage capacity of the object storage device according to storage capacity of the object storage device, the number of times of forwarding the object write request and the size of the written object.

According to the controller provided in the embodiment of the present invention, by using a SDN, the controller formulates, according to remaining storage capacity of each storage device in a storage system, a flow table entry of a switch and a forwarding rule matching a write request, thereby implementing load balancing of each storage device and reducing information interaction between the storage devices.

According to the description of the foregoing method embodiments of the present invention, an embodiment of the present invention provides a controller. As shown in FIG. 11, the controller includes an obtaining unit 1101 and a generating unit 1102. In the embodiment of the present invention, the obtaining unit 1101 is configured to obtain flow load information of storage devices that store requested data; and the generating unit 1102 is configured to generate, according to the flow load information of the storage devices that store the requested data, a forwarding rule matching a read request. In an implementation manner, the obtaining unit 1101 is specifically configured to receive the flow load information reported by the storage devices that store the requested data. In an implementation manner, the obtaining unit 1101 is specifically configured to obtain the number of times of forwarding an operation request to the storage devices that store the requested data, where the number of times is recorded in a flow table entry of a flow table of the switch, and the operation request includes a write request and a read request.

Specifically, in an object storage system, the obtaining unit 1101 is configured to obtain flow load information of object storage devices that store a requested object; and the generating unit 1102 is configured to generate, according to the flow load information of the object storage devices that store the requested object, a forwarding rule matching an object read request. In an implementation manner, the obtaining unit 1101 is specifically configured to receive the flow load information reported by the object storage devices that store the requested object. In an implementation manner, the obtaining unit 1101 is specifically configured to obtain the number of times of forwarding an object operation request to the object storage devices that store the requested object, where the number of times is recorded in a flow table entry of a flow table of the switch, and the object operation request includes an object write request and an object read request.

According to the controller provided in the embodiment of the present invention, by using a SDN, the controller formulates, according to flow load of storage devices that store requested data in a storage system, a flow table entry of a switch and a forwarding rule matching a read request, thereby implementing load balancing of each storage device and reducing information interaction between the storage devices.

For a specific functional description of the switch and the controller described in the foregoing apparatus embodiments of the present invention, reference may further be made to the method embodiments; in addition, for an application scenario, reference may be made to the architectural diagram shown in FIG. 2 and the description, and details are not repeatedly described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. Furthermore, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to implement the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing nonvolatile storage medium includes any medium that can store program code, such as a USB flash drive, a removable hard disk, a read-only memory (Read-Only Memory, ROM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method implemented by a switch, the method comprising:
   receiving a write request comprising a request identification, wherein the request identification comprises storage strategy information indicating a number of copies of an object;
   querying, according to the request identification, a flow table of the switch to obtain a flow table entry matching the write request, wherein
   the forwarding rule of the matching flow table entry is formulated according to remaining storage capacity of storage devices; and
   forwarding the write request to a plurality of target storage devices of the storage devices according to the forwarding rule of the matching flow table entry.

2. The method of claim 1, wherein the request identification further comprises user group information, and wherein a virtual local area network identification field of the write request carries the user group information, and a virtual local area network identification field in a packet header field of the matching flow table entry carries the user group information.

3. The method of claim 1, wherein
an Internet Protocol Type of Service field in a packet header field of the matching flow table entry carries the storage strategy information.

4. The method of claim 1, wherein the request identification further comprises user group information, and wherein a virtual local area network identification field of the write request carries the user group information, a virtual local area network identification field in a packet header field of the matching flow table entry carries the user group information, and an Internet Protocol Type of Service field in a packet header field of the matching flow table entry carries the storage strategy information.

5. The method of claim 1, further comprising:
updating a number of times that the write request is forwarded to the target storage devices, wherein a number of times is recorded in the matching flow table entry.

6. A switch comprising:
a memory configured to store instructions;
a processor coupled to the memory and configured to execute the instructions to:
receive a flow table comprising a plurality of flow table entries from a controller coupled to the switch;
receive a write request comprising a request identification, wherein the request identification comprises storage strategy information indicating a number of copies of an object;
query, according to the request identification, the flow table to obtain a flow table entry matching the write request, wherein
the forwarding rule of the matching flow table entry is formulated according to remaining storage capacity of storage devices; and
forward the write request to a plurality of target storage devices of the storage devices according to the forwarding rule of the matching flow table entry.

7. The switch of claim 6, wherein the request identification further comprises user group information, and wherein
a virtual local area network identification field of the write request carries the user group information, and a virtual local area network identification field in a packet header field of the matching flow table entry carries the user group information.

8. The switch of claim 6, wherein
an Internet Protocol Type of Service field in a packet header field of the matching flow table entry carries the storage strategy information.

9. The switch of claim 6, wherein the request identification further comprises user group information, and wherein
a virtual local area network identification field of the write request carries the user group information, a virtual local area network identification field in a packet header field of the matching flow table entry carries the user group information, and an Internet Protocol Type of Service field in a packet header field of the matching flow table entry carries the storage strategy information.

10. The switch of claim 6, wherein processor executes the instructions to:
update a number of times that the write request is forwarded to the target storage devices, wherein the number of times is recorded in the matching flow table entry.

11. A nonvolatile computer readable storage medium comprising instructions that when executed by one or more processors of a switch, cause the one or more processors to:
receive a write request comprising a request identification, wherein the request identification comprises storage strategy information indicating a number of copies of an object;
query, according to the request identification, a flow table of the switch to obtain a flow table entry matching the write request, wherein
forwarding rule of the matching flow table entry is formulated according to remaining storage capacity of storage devices; and
forward the write request to a plurality of target storage devices of the storage devices according to the forwarding rule of the matching flow table entry.

12. The nonvolatile computer readable storage medium of claim 11, further comprising instructions that when executed by the one or more processors, cause the one or more processors to:
update a number of times that a write request is forwarded to the target storage devices, wherein the number of times is recorded in the matching flow table entry.

* * * * *